(12) United States Patent
Sigler et al.

(10) Patent No.: US 10,052,710 B2
(45) Date of Patent: Aug. 21, 2018

(54) RESISTANCE SPOT WELDING STEEL AND ALUMINUM WORKPIECES USING ELECTRODE WELD FACE COVER

(71) Applicant: GM Global Technology Operations LLC, Detroit, MI (US)

(72) Inventors: David R. Sigler, Shelby Township, MI (US); Blair E. Carlson, Ann Arbor, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 862 days.

(21) Appl. No.: 14/462,655

(22) Filed: Aug. 19, 2014

(65) Prior Publication Data
US 2015/0053654 A1    Feb. 26, 2015

Related U.S. Application Data

(60) Provisional application No. 61/869,358, filed on Aug. 23, 2013.

(51) Int. Cl.
*B23K 9/28* (2006.01)
*B23K 11/20* (2006.01)
(Continued)

(52) U.S. Cl.
CPC ............. *B23K 11/20* (2013.01); *B23K 11/115* (2013.01); *B23K 11/30* (2013.01);
(Continued)

(58) Field of Classification Search
CPC ....... B23K 11/115; B23K 11/20; B23K 11/30; B23K 11/3063; B23K 2203/20; B23K 35/0205; B23K 11/10
(Continued)

(56) References Cited

U.S. PATENT DOCUMENTS 4,668,136 A * 5/1987 Santa ...................... B23B 5/166
219/119
7,432,466 B2   10/2008 Spinella et al.
(Continued)

FOREIGN PATENT DOCUMENTS

CN      101336148 A    12/2008
JP      H03138085 A    6/1991
(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — Dana Ross
*Assistant Examiner* — Joseph Iskra
(74) *Attorney, Agent, or Firm* — Reising Ethington P.C.

(57) ABSTRACT

A method of resistance spot welding a steel workpiece and an aluminum or aluminum alloy ("aluminum") workpiece together includes several steps. One step involves providing a workpiece stack-up with a steel workpiece and an aluminum workpiece. Another step involves attaching a cover over a weld face of a welding electrode. The cover is made of a metal material with an electrical resistivity that is greater than an electrical resistivity of a material of the welding electrode. Yet another step involves performing multiple individual resistance spot welds to the workpiece stack-up. The cover abuts the aluminum workpiece while the individual resistance spot welds are performed. And another step involves removing the cover from the welding electrode after the individual spot welds are performed.

16 Claims, 2 Drawing Sheets

(51) Int. Cl.
  *B23K 11/11* (2006.01)
  *B23K 11/30* (2006.01)
  *B23K 35/02* (2006.01)
  *B23K 103/20* (2006.01)

(52) U.S. Cl.
  CPC ...... *B23K 11/3063* (2013.01); *B23K 35/0205* (2013.01); *B23K 2203/20* (2013.01)

(58) Field of Classification Search
  USPC .............................. 219/87, 91.2, 92, 94, 119
  See application file for complete search history.

(56) References Cited

U.S. PATENT DOCUMENTS

| | | | |
|---|---|---|---|
| 7,850,059 B2 | 12/2010 | Kobayashi et al. | |
| 7,935,908 B2 | 5/2011 | Nakagawa et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |
| 8,487,206 B2 | 7/2013 | Urushihara et al. | |
| 2013/0189023 A1* | 7/2013 | Spinella ............. | B23K 11/0026 403/270 |

FOREIGN PATENT DOCUMENTS

| | | | |
|---|---|---|---|
| JP | H06226456 | * | 8/1994 |
| JP | H06226456 A | | 8/1994 |
| JP | H1110350 A | | 1/1999 |
| JP | 11342477 | | 12/1999 |
| JP | 2002361440 A | | 12/2002 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Yang et al., U.S. Appl. No. 14/181,020 entitled "Electrode for Resistance Spot Welding of Dissimilar Metals," filed Feb. 14, 2014.

Yang et al., U.S. Appl. No. 14/181,955 entitled "Resistance Spot Welding Steel and Aluminum Workpieces with Protuberance," filed Feb. 17, 2014.

Sigler et al., U.S. Appl. No. 14/268,422 entitled "Resistance Spot Welding of Steel to Pre-Coated Aluminum," filed May 2, 2014.

Sigler et al., U.S. Appl. No. 14/462,655 entitled "Resistance Spot Welding Steel and Aluminum Workpieces Using Electrode Weld Face Cover," filed Aug. 19, 2014.

Sigler et al, U.S. Appl. No. 14/464,476 entitled "Multi-Step Direct Welding of an Aluminum-Based Workpiece to a Steel Workpiece," filed Aug. 20, 2014.

Schroth et al., U.S. Appl. No. 14/488,799 entitled "Resistance Spot Welding Steel and Aluminum Workpieces with Hot Welding Electrode at Aluminum Workpiece," filed Sep. 17, 2014.

Carlson et al, U.S. Appl. No. 14/503,504 entitled "Resistance Spot Welding Steel and Aluminum Workpieces Using Insertable Cover," filed Oct. 1, 2014.

Sigler et al., U.S. Appl. No. 14/503,969 entitled "Aluminum Alloy to Steel Welding Process," filed Oct. 1, 2014.

Wang et al, U.S. Appl. No. 14/561,746 entitled "Resistance Spot Welding Steel and Aluminum Workpieces with Electrode Insert," filed Dec. 5, 2014.

* cited by examiner

RESISTANCE SPOT WELDING STEEL AND ALUMINUM WORKPIECES USING ELECTRODE WELD FACE COVER

CROSS-REFERENCE TO RELATED APPLICATIONS

This application claims the benefit of U.S. provisional patent application No. 61/869,358, filed on Aug. 23, 2013, the entire contents of which are hereby incorporated by reference.

TECHNICAL FIELD

The technical field of this disclosure relates generally to resistance spot welding and, more particularly, to resistance spot welding a steel workpiece and an aluminum or aluminum alloy workpiece together.

BACKGROUND

Resistance spot welding is a process used in a number of industries for joining two or more metal workpieces together. The automotive industry, for example, often uses resistance spot welding to join together pre-fabricated metal workpieces during the manufacture of a vehicle door, hood, trunk lid, or lift gate, among others. Multiple individual resistance spot welds are typically made along a periphery of the metal workpieces or at some other bonding region to ensure the vehicle part is structurally sound. While spot welding has typically been performed to join together certain similarly-composed metal workpieces—such as steel-to-steel and aluminum alloy-to-aluminum alloy—the desire to incorporate lighter weight materials into a vehicle body structure has created interest in joining steel workpieces to aluminum or aluminum alloy (hereafter collectively "aluminum" for brevity) workpieces by resistance spot welding.

Resistance spot welding, in general, relies on the resistance to the flow of an electrical current through contacting metal workpieces and across their faying interface to generate heat. To carry out such a resistance welding process, a pair of opposed welding electrodes are typically clamped at aligned spots on opposite sides of the workpieces at a predetermined weld site. An electrical current is then passed through the workpieces from one welding electrode to the other. Resistance to the flow of this electrical current generates heat within the workpieces and at their faying interface. When the metal workpieces being welded are a steel workpiece and an aluminum alloy workpiece, the heat generated at the faying interface initiates a molten weld pool in the aluminum alloy workpiece. This molten aluminum alloy weld pool wets the adjacent surface of the steel workpiece and, upon stoppage of the current flow, solidifies into a weld joint.

Resistance spot welding a steel workpiece and an aluminum workpiece together presents certain challenges. These metals have considerable dissimilarities that tend to disrupt the welding process. For one, steel has a relatively high melting point and relatively high thermal and electrical resistivities, while aluminum has a relatively low melting point and relatively low thermal and electrical resistivities. As a result of these differences, aluminum melts more quickly and at a much lower temperature than steel during current flow. Aluminum also cools down more quickly than steel after current flow has ceased. Controlling heat balance between the two metals so that a molten weld pool can be rapidly initiated and solidified in the aluminum workpiece can therefore be challenging. It has been found, for example, that upon rapid cooling, defects in the aluminum workpiece such as shrink porosity or shrinkage, gas porosity, oxide residue, and micro-cracking are drawn toward and tend to gather at the faying interface. Additionally, prolonged heating during resistance spot welding—more specifically an elevated temperature in the steel workpiece due to its relatively higher resistance—is conducive to the growth of brittle Fe—Al intermetallic layers at the faying interface. These two conditions have been shown to reduce the peel strength of the ultimately-formed weld joint and weaken the overall integrity of the established joint between the workpieces.

SUMMARY OF THE DISCLOSURE

A method of resistance spot welding a workpiece stack-up that includes a steel workpiece and an aluminum or aluminum alloy ("aluminum") workpiece is disclosed. The method uses a cover attached to, but removable from, a welding electrode on the aluminum-side of the stack-up. The cover is made of a metal material with a higher electrical resistivity than that of the welding electrode to which it is attached, and consequently generates more heat on the aluminum-side than would otherwise be the case without the cover when spot welds are performed. Examples of materials for the cover include, but are not limited to, steel, stainless steel, molybdenum, tungsten, niobium, and alloys thereof.

The increased heat attributed to the cover better balances heat developed between the steel and aluminum workpieces and, it has been found, alters the solidification behavior of a weld joint produced in the aluminum workpiece in a way that precludes the undesirable accumulation of defects at and along a faying interface of the stack-up. It can also help reduce heating in the steel workpiece which, in turn, reduces growth of the brittle Fe—Al intermetallic layers at the faying surface. The overall strength and integrity of the established weld joint between the workpieces can thus be improved by use of the cover. And, because the cover can be removed, the same welding electrode can be employed to spot weld workpiece stack-ups including aluminum-to-aluminum workpieces and steel-to-steel workpieces. The ability to do so greatly augments manufacturing flexibility and reduces costs. A spot welding assembly that can accomplish the above is also disclosed.

DETAILED DESCRIPTION

The methods and assembly detailed in this description resolve several challenges encountered when resistance spot welding is performed on a workpiece stack-up that includes an aluminum workpiece and a steel workpiece. Though described in more detail below, in general the methods and assembly described can alter the solidification behavior of a created weld pool and thereby limit or altogether preclude the accumulation of defects at and along a faying interface of the stack-up. The methods and assembly can also minimize the size and thickness of Fe—Al intermetallic layers formed at the faying interface. Of course, other improvements are possible. Taken together or alone, these measures help maintain suitable peel strength of a solidified weld joint between the aluminum and steel workpieces, and help ensure the overall strength and integrity of the established weld joint between the workpieces. The term "workpiece" and its steel and aluminum variations is used broadly in this description to refer to a sheet metal layer, a casting, an extrusion, or any other piece that is resistance spot weldable, inclusive on any surface layers or coating, if present. Furthermore, value ranges provided in this description are meant to include their outer and end limits.

Figure 1:
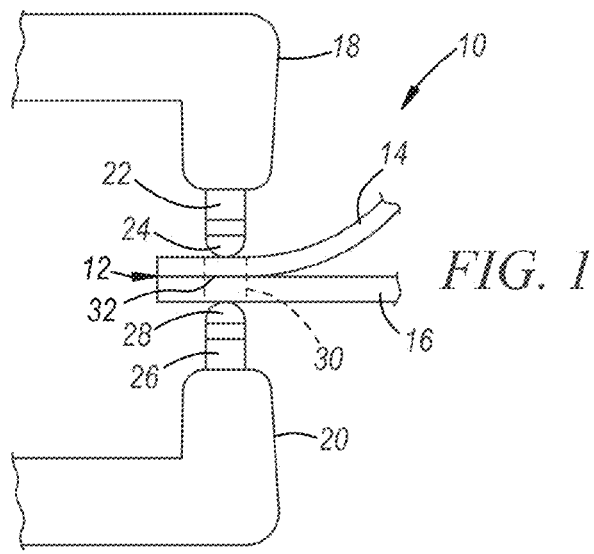
FIG. 1 is a side view of a resistance spot welding assembly.

FIG. 1 shows one example of a spot welding assembly 10 that can be used to resistance spot weld a workpiece stack-up 12 that includes a steel workpiece 14 and an aluminum workpiece 16 that are overlaid on each other. The steel workpiece 14 can be a galvanized low carbon steel, a galvanized advanced high strength steel (AHSS), an aluminum coated steel, a low carbon steel, a bare steel, or another type of steel. Some more specific kinds of steels that can be employed include, but are not limited to, interstitial-free (IF) steel, dual-phase (DP) steel, transformation-induced plasticity (TRIP) steel, and press-hardened steel (PHS). The aluminum workpiece 16, on the other hand, can be an aluminum-magnesium alloy, an aluminum-silicon alloy, an aluminum-magnesium-silicon alloy, an aluminum-zinc alloy, an aluminum metal, or another type of aluminum. Some more specific kinds of aluminum that can be employed include, but are not limited to, 5754 aluminum-magnesium alloy, 6022 aluminum-magnesium-silicon alloy, 7003 aluminum-zinc alloy, and Al-10Si—Mg aluminum die casting alloy. In addition, the aluminum workpiece 16 may include zinc or conversion coatings typically used to improve adhesive bond performance, and weld-through adhesives or sealers as are normally used in resistance spot welding operations may also be present. Each of the steel and aluminum workpieces 14, 16 can have a thickness dimension that ranges between approximately 0.3 mm and 6.0 mm, between approximately 0.5 mm and 4.0 mm, and more narrowly between 0.6 mm and 2.5 mm.

The spot welding assembly 10 is typically a part of a larger automated welding operation that includes a first welding gun arm 18 and a second welding gun arm 20 mechanically and electrically configured to repeatedly form spot welds, as is well understood in the art. The first welding gun arm 18 has a first electrode holder 22 that secures a first welding electrode 24, and likewise the second welding gun arm 20 has a second electrode holder 26 that secures a second welding electrode 28. The welding electrodes 24, 28 can be composed of a suitable copper alloy. When performing resistance spot welding, the welding gun arms 18, 20 clamp their respective welding electrodes 24, 28 against opposite sides and outer surfaces of the overlaid workpieces 14, 16 at a weld site 30, with accompanying weld faces of the electrodes aligned across and with each other. A faying interface 32 is located between the steel and aluminum workpieces 14, 16 at confronting and abutting inner surfaces of the workpieces.

Figure 2:
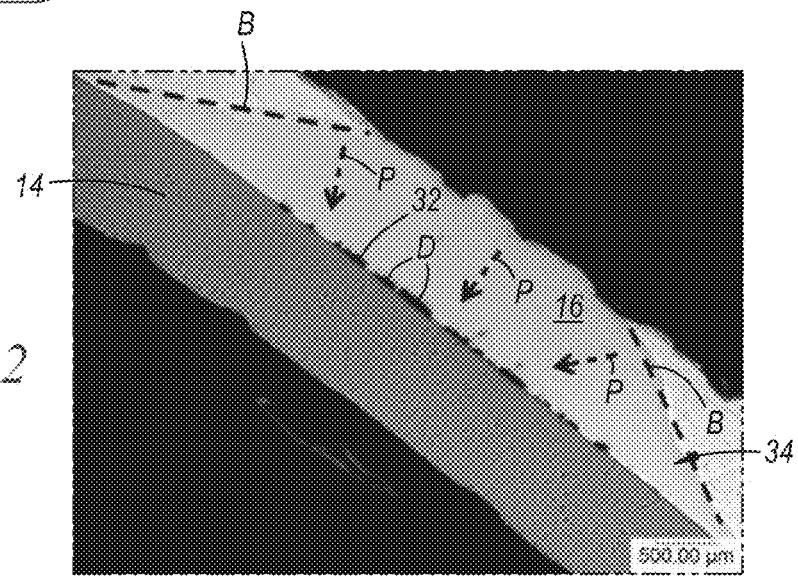
FIG. 2 is a microstructure of a weld nugget formed via a resistance spot welding process without the use of an electrode weld face cover.

FIG. 2 illustrates a microstructure of a weld joint 34 in the aluminum workpiece 16 formed via a resistance spot welding process without the use of an electrode weld face cover like the one detailed below. The weld joint 34 is also referred to as a spot weld. While a suitable weld joint may be formed in some instances without using the electrode weld face cover, in this example defects D within the weld joint 34 are shown at and along the faying interface 32. Among other possibilities, the defects D may include shrink porosity or shrinkage, gas porosity, oxide residue, and micro-cracking. When present and accumulated along the faying interface 32, particularly when distributed to the outer perimeter of the weld joint 34 at the faying interface 32, it has been found that the defects D may reduce the peel strength of the weld joint 34 and may more generally negatively impact and weaken the overall integrity of the joint. Moreover, in addition to the defects D, one or more Fe—Al intermetallic layers (not shown) may grow between the steel and aluminum workpieces 14, 16 and at the faying interface 32. The Fe—Al intermetallic layers can consist of $FeAl_3$ and $Fe_2Al_5$, as well as other compounds, and when present are often hard and brittle. Again, here, the Fe—Al intermetallic layers can have a negative impact on the overall integrity of the weld joint 34 established between workpieces 14, 16.

Although not intending to be confined to particular theories of causation, it is currently believed that the accumulation of the defects D at the faying interface 32 is due in part or more to the solidification behavior of the weld joint 34. That is, during current flow, a heat imbalance can develop between the much hotter steel workpiece 14 and the comparatively cooler aluminum workpiece 16 because of the dissimilar physical properties of the two metals—namely, the much greater electrical resistivity and thermal resistivity of the steel. The steel therefore acts as a heat source, while the aluminum acts as a heat conductor. Because of this heat imbalance, the molten weld pool in the aluminum workpiece 16 cools and solidifies from its outer surface in contact with the cooler (e.g., water cooled) welding electrode toward its inner surface and toward the faying interface 32 upon cessation of current flow. The solidification path and direction is represented generally in FIG. 2 by broken arrows P, and a boundary of the weld joint 34 is represented by broken lines B. The path P is pointed at the faying interface 32 and the more slanted boundary B (compared to that shown in FIG. 4) is the result of solidification toward the faying interface 32. Directed this way, any defects D upon complete solidification may be drawn toward the faying interface 32 and end up situated at and along the faying interface 32. Furthermore, it is currently believed that the growth of the Fe—Al intermetallic layer is due primarily to the increased temperature experienced by the steel workpiece 14 during the resistance spot welding process, as described above.

Figure 3:
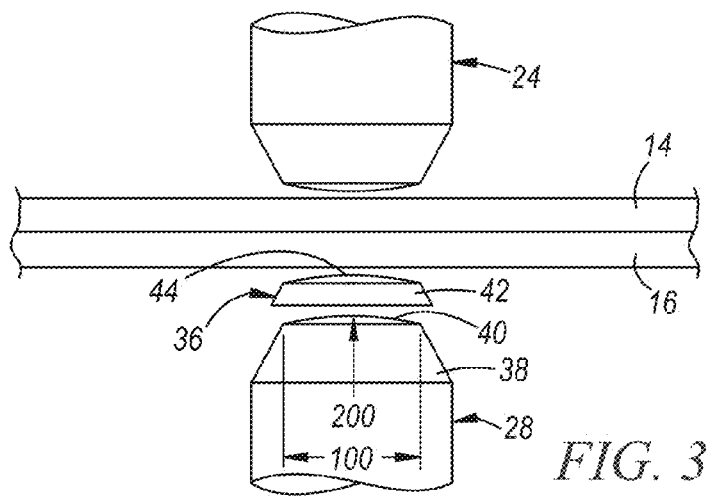
FIG. 3 is an exploded view of a pair of welding electrodes, a workpiece stack-up including a steel workpiece and an aluminum workpiece, and an electrode weld face cover.

Referring now to FIG. 3, in order to limit and in some cases altogether preclude the accumulation of the defects D at and along the faying interface 32, and to minimize the size and thickness of the Fe—Al intermetallic layers thereat, an electrode weld face cover (hereafter "cover") 36 is used with the welding electrode on the aluminum side of the workpiece stack-up 12 and is meant to come into contact with the aluminum workpiece 16 (in this example, the second welding electrode 28). As described below, because the cover 36 is made of a metal material exhibiting a greater electrical resistance than that of the welding electrode to which the cover 36 is attached and also possibly greater than that of the aluminum workpiece 16, a relatively increased amount of heat is generated at the aluminum workpiece 16 than would otherwise be the case. The increased temperature better balances the heat developed between the steel and aluminum workpieces 14, 16 and, hence, helps maintain suitable peel strength and helps ensure the overall strength and integrity of the weld joint 34 established between the workpieces 14, 16.

As mentioned, the cover 36 is made of a metal material with an electrical resistivity that is greater in value than an electrical resistivity of the second welding electrode 28 so that the cover 36 generates more heat than the second welding electrode 28 would otherwise generate on its own. The metal material of the cover 36 may, for example, have an electrical conductivity (which is the inverse of electrical resistivity) that is less than 50% IACS. In addition to being composed of a material with a relatively low electrical resistance, the second welding electrode 28 also does not generate much heat because it is typically water cooled or cooled in another way. The acronym "IACS" refers to the International Annealed Copper Standard (IACS), as will be known to skilled artisans; that is, the electrical conductivity associated with IACS (sometimes referred to as 100% IACS) is the electrical conductivity of commercially pure, annealed copper at 20° C., which is defined as $5.80 \times 10^7$ Siemens/meter (S/m).

In the example of the second welding electrode 28 being composed of a copper alloy material, the cover 36 can then be made of a steel material such as a stainless steel or a bare low carbon steel. The cover 36 can also be made of a metal with a high melting temperature and a high electrical resistivity, and that exhibits limited reaction with aluminum; these would include molybdenum, tungsten, and niobium, as well as others. Furthermore, the metal material of the cover 36 can also exhibit greater electrical resistivity than that of the aluminum workpiece 16 in order to generate increased heat relative to that workpiece.

The cover 36 has a size and shape that generally matches and complements a weld face and an end portion of the second welding electrode 28 so that the cover 36 can fit over the weld face and end portion when it is attached thereto. Although called a "weld face cover," the cover 36 can envelope more than just a weld face of the associated welding electrode and may also envelope sections of the welding electrode extending beyond the weld face, though need not. The end portion of the second welding electrode 28 has a frusto-conical section 38 and a domed weld face 40; other constructions are possible including one in which a curved and more rounded section replaces the frusto-conical section. In the embodiment of FIG. 3, then, the cover 36 is hollow at its interior and has a complementary frusto-conical section 42 and a complementary domed weld face 44. In another embodiment, the cover 36 can be initially flatter than shown or an entirely flat and planar sheet, and can be subsequently metalworked over the end portion of the second welding electrode 28 to take on the shape of the end portion.

In specific non-limiting examples, the weld face 40 of the second welding electrode 28 can have a diameter dimension 100 ranging between approximately 5 mm and 20 mm and preferably between 8 mm and 12 mm, and can have a radius of curvature dimension 200 ranging between approximately 8 mm and flat. Similarly, in specific non-limiting examples, the weld face 44 of the cover 36 can have a diameter dimension ranging between approximately 5 mm and 20 mm and preferably between 8 mm and 12 mm, and can have a radius of curvature dimension ranging between approximately 8 mm and flat. Other diameter and radius of curvature dimensions are possible. The cover 36 can have a uniform thickness across its structure. In specific non-limiting examples, the thickness value of the cover 36 can range between approximately 0.05 mm to 5.0 mm, between approximately 0.1 mm to 0.5 mm, and can be approximately 0.2 mm or 0.3 mm. Other thickness values are possible.

The attachment between the cover 36 and the end portion of the second welding electrode 28 can be accomplished by a variety of techniques. Whatever the technique, however, the attachment is temporary and non-permanent in the sense that the cover 36 is eventually detached and removed, although not necessarily discarded, from the end portion after the performance of a number of individual resistance spot welds, as is described below. In other words, the cover 36 is designed to be detachable. In most cases, the attachment should be robust enough to maintain a tight fit between the cover 36 and end portion for more than a single resistance spot weld, and should be capable of enduring multiple automated spot welds as is conventional in the manufacture of vehicle body parts. In some embodiments, the cover 36 and end portion are attached together by way of one or more metalworking processes. For example, the attachment can be made by a crimping process, a stamping process, a screwing or threading process, or another way. The cover 36 can hence be attached to the end portion of the second welding electrode 28 with a snap-on attachment, a press-fit attachment, a force-fit attachment, a screw-on/screw-off attachment, or some other attachment. In one specific example, the attachment can resemble that made between a bottle cap and a glass bottle—that is, the frusto-conical section 42 or other skirt section of the cover 36 would be pinched at spaced intervals around the section to squeeze the frusto-conical section 42 of the cover 36 against the frusto-conical section 38 of the second welding electrode 28. The exerted force keeps the cover 36 and second welding electrode 28 together.

The subsequent detachment of the cover 36 may then of course depend on the attachment made between the cover 36 and second welding electrode 28. In some examples, detachment can be accomplished manually by hand or with the assistance of a tool like a fork for prying the cover 36 off of the second welding electrode 28 or pliers for screwing the cover 36 off of the second welding electrode 28. In other examples, the detachment is accomplished by machine and is automated and a part of the larger welding operation.

Upon attachment, an inside and interior surface of the cover 36 makes metal-to-metal contact with the weld face 40 of the second welding electrode 28 at one or more places. In some embodiments, for example, the cover 36 is initially flat and its inside surface only contacts a centerpoint of the domed weld face 40. Subsequently, during resistance spot welding, the heat and pressure generated can cause the cover 36 to more fully take on the shape of the domed weld face 40. Still further, the weld face 40 may be outfitted with provisions for penetrating through oxide layers that could be present on the outer surface of an aluminum workpiece such as a set of protruding rings, surface texturing and roughening, or something else.

When used with the spot welding assembly 10, the cover 36 alters the solidification behavior of the weld joint 34 and thereby limits or altogether precludes the accumulation of defects D at and along the faying interface 32. Because the cover 36 exhibits greater electrical resistivity than the second welding electrode 28, the cover 36, during current flow, heats up to a greater degree and provides more heat on the aluminum side of the workpiece stack-up 12 and at the outer surface of the aluminum workpiece 16. The improved heat balance and more equal heat distribution changes the cooling action of the molten weld pool as it solidifies to become the weld joint 34 within the aluminum workpiece 16.

Figure 4:
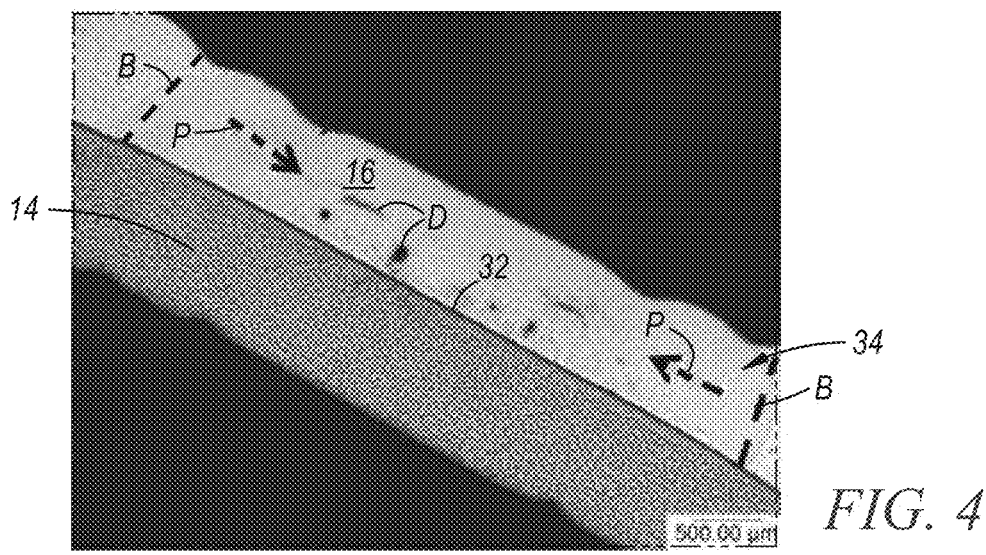
FIG. 4 is a microstructure of a weld nugget formed via a resistance spot welding process using the electrode weld face cover of FIG. 3.

Referring now to the microstructure of FIG. 4, instead of solidifying toward the faying interface 32 as is demonstrated in FIG. 2 and described above, the molten weld pool in the aluminum workpiece 16 cools and solidifies from an exterior region of the weld joint 34 toward a central region. The solidification path and direction is represented generally in FIG. 4 by broken arrows P, and a boundary of the weld joint 34 is represented by broken lines B. The path P is pointed toward the central region and the boundary B is more orthogonal (compared to that shown in FIG. 2) relative to the faying interface 32 as a result of the altered solidification path. Amid solidification in FIG. 4, any defects D migrate toward and settle at the central region and are largely situated away from the faying interface 32, as depicted, or are more consolidated near the center of the weld joint 34 and less dispersed along the faying interface 32. This reduction or elimination of defects D along the faying interface 32, particularly at the outer perimeter of the weld joint 34, improves mechanical performance. Accordingly, suitable peel strength is maintained and the overall strength and integrity of the established weld joint 34 between the workpieces 14, 16 is ensured.

Moreover, the improved heat balance also means that the level of heat produced on the steel side of the workpiece stack-up 12 can be reduced, thus allowing the level of electrical current level flowing through the workpiece stack-up 12 to be reduced. These reductions minimize diffusion between Fe and Al and, consequently, minimize the attendant size and thickness of any Fe—Al intermetallic layers that may form at the faying interface 32. It has been determined that the greater the size and thickness of Fe—Al intermetallic layers, the more brittle the layers and the more likely they are to fracture under load. Minimizing the layers helps maintain suitable peel strength and helps ensure overall strength and integrity of the established weld joint 34.

Figure 5:
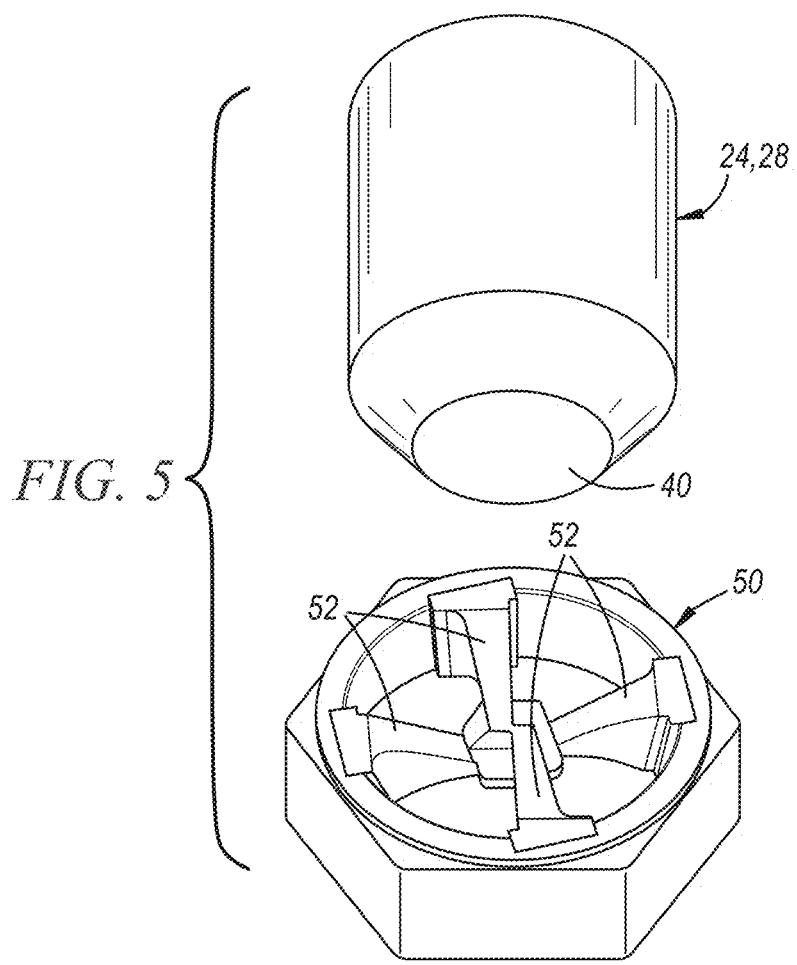
FIG. 5 is a perspective view of a cutting tool and welding electrode.

In the larger automated welding operation, the second welding electrode 28 can be equipped with the cover 36 for only part of the operation. The cover 36 can be removed and the second welding electrode 28 used without a cover to perform additional resistance spot welds. In one example, the cover 36 is attached to the second welding electrode 28 and multiple resistance spot welds—e.g., two to fifteen welds—are performed to a workpiece stack-up like the workpiece stack-up 12 with steel and aluminum workpieces 14, 16. The number of welds capable of being made with the cover 36 attached differentiates the cover from previously-known welding cover plates which are only used once and then replaced (i.e., single use). Once welding of the workpiece stack-up 12 has been completed, the cover 36 can be removed from the second welding electrode 28 and the welding electrode assembly 10 can be used to perform multiple resistance spot welds to other stack-ups including two overlaid aluminum (aluminum-to-aluminum) workpieces or two overlaid steel (steel-to-steel) workpieces. Indeed, resistance spot welds can be performed on both aluminum-to-aluminum workpieces and steel-to-steel workpieces. In this example, after spot welding of the other stack-ups is complete, the weld faces of the welding electrodes 24, 28 may be re-dressed to remove contamination build-up on the weld faces. A cutting tool such as tool 50 in FIG. 5 can be used to perform this task, for example. The welding electrodes 24, 28 and rapidly rotating blades 52 can be advanced toward each other (or one toward the other) and meet to shear off a depth of material from the weld faces. Other examples of dressing are possible. Once freshly dressed, a new cover 36 or an old cover 36 that is still operationally functional—particularly if the cover 36 is made from a refractory metal such as molybdenum, tungsten, or niobium—may be attached to the second welding electrode 28 and the operation may commence again on other workpiece stack-ups. These different steps in the operation can be achieved by way of different and dedicated work stations.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding, the method comprising:
   providing a workpiece stack-up that includes a steel workpiece and an aluminum or aluminum alloy workpiece;
   providing a first welding electrode positioned to contact the steel workpiece and a second welding electrode positioned to contact the aluminum or aluminum alloy workpiece, each of the first welding electrode and the second welding electrode being composed of a copper alloy;
   attaching a cover at least over a weld face of the second welding electrode, the cover having a weld face and being made of a metal material with an electrical resistivity that is greater than an electrical resistivity of the copper alloy of the second welding electrode, the cover being removably attached to the second welding electrode;
   performing a plurality of individual resistance spot welds to the workpiece stack-up, the cover abutting the aluminum or aluminum alloy workpiece while the individual resistance spot welds are performed; and
   removing the cover from the welding electrode after the individual resistance spot welds are performed.

2. The method as set forth in claim 1, wherein the cover is attached to the welding electrode via a crimping process, a stamping process, a screwing process, or a combination of two or more of these processes.

3. The method as set forth in claim 1, wherein the cover is made of steel, stainless steel, molybdenum, tungsten, or niobium.

4. The method as set forth in claim 1, wherein the cover generates heat at the aluminum or aluminum alloy workpiece upon its abutment and upon performance of an individual resistance spot weld, and the generated heat alters solidification behavior of a molten weld pool created in the aluminum or aluminum alloy workpiece via the individual resistance spot weld.

5. The method as set forth in claim 1, further comprising:
   providing a second workpiece stack-up that includes a steel workpiece and an aluminum or aluminum alloy workpiece;
   attaching a second cover at least over the weld face of the second welding electrode, the second cover having a weld face and being made of a metal material with an electrical resistivity that is greater than the electrical resistivity of the copper alloy of the second welding electrode, the second cover being removably attached to the second welding electrode; and
   performing a plurality of second individual resistance spot welds to the second workpiece stack-up, the second cover abutting the aluminum or aluminum alloy workpiece of the second workpiece stack-up while the second individual resistance spot welds are performed.

6. The method as set forth in claim 1, further comprising: performing a plurality of second individual resistance spot welds to a second workpiece stack-up that includes a first steel workpiece and a second steel workpiece, or that includes a first aluminum or aluminum alloy workpiece and a second aluminum or aluminum alloy workpiece, without the cover.

7. The method as set forth in claim 6, further comprising dressing the weld face of the second welding electrode after the second individual resistance spot welds are performed.

8. The method as set forth in claim 7, further comprising:
providing a third workpiece stack-up that includes a steel workpiece and an aluminum or aluminum alloy workpiece;
attaching a second cover at least over the weld face of the second welding electrode after the weld face is dressed, the second cover having a weld face and being made of a metal material with an electrical resistivity that is greater than the electrical resistivity of the copper alloy of the second welding electrode, the second cover being removably attached to the second welding electrode; and
performing a plurality of third individual resistance spot welds to the third workpiece stack-up, the second cover abutting the aluminum or aluminum alloy workpiece of the third workpiece stack-up while the third individual resistance spot welds are performed.

9. The method as set forth in claim 1, wherein the material of the cover has an electrical resistivity that is greater than an electrical resistivity of the aluminum or aluminum alloy workpiece.

10. A welding electrode assembly comprising:
a workpiece stack-up that includes a steel workpiece and an aluminum or aluminum alloy workpiece;
a first welding electrode in contact with the steel workpiece;
a second welding electrode made of a first metal material, the second welding electrode including a weld face; and
a cover removably attached to the second welding electrode and covering at least the weld face of the second welding electrode, the cover further abutting the aluminum or aluminum alloy workpiece when resistance spot welding the steel workpiece and the aluminum or aluminum alloy workpiece together, the cover being made of a second metal material with an electrical resistivity that is greater than an electrical resistivity of the first metal material, and wherein the first welding electrode lacks a cover removably attached thereto.

11. The welding electrode assembly of claim 10, wherein the cover is removably attached to the first welding electrode via a crimping process, a stamping process, a screwing process, or a combination of two or more of these processes.

12. The welding electrode assembly of claim 10, wherein the second metal material of the cover is steel, stainless steel, molybdenum, tungsten, or niobium.

13. The welding electrode assembly of claim 10, wherein the second metal material of the cover has an electrical resistivity that is greater than an electrical resistivity of the aluminum or aluminum alloy workpiece.

14. A method of resistance spot welding, the method comprising:

providing a workpiece stack-up that includes a steel workpiece and an aluminum or aluminum alloy workpiece;
providing a first welding electrode positioned to contact the steel workpiece and a second welding electrode positioned to contact the aluminum or aluminum alloy workpiece, each of the first welding electrode and the second welding electrode being composed of a copper alloy;
attaching a cover at least over a weld face of the second welding electrode, the cover having a weld face and being made of a metal material with an electrical resistivity that is greater than an electrical resistivity of the copper alloy of the second welding electrode and that is greater than an electrical resistivity of the aluminum or aluminum alloy workpiece, the cover being removably attached to the second welding electrode;
performing a plurality of individual resistance spot welds to the workpiece stack-up using the first and second welding electrodes, the cover abutting the aluminum or aluminum alloy workpiece while the individual resistance spot welds are performed;
removing the cover from the second welding electrode after the individual resistance spot welds are performed;
providing a second workpiece stack-up that includes a first steel workpiece and a second steel workpiece, or that includes a first aluminum or aluminum alloy workpiece and a second aluminum or aluminum alloy workpiece;
performing a plurality of second individual resistance spot welds to the second workpiece stack-up using the first and second welding electrodes after the cover is removed from the second welding electrode;
providing a third workpiece stack-up that includes a steel workpiece and an aluminum or aluminum alloy workpiece;
attaching the cover or a second cover at least over the weld face of the second welding electrode, the second cover, if used, being made of a metal material with an electrical resistivity that is greater than the electrical resistivity of the copper alloy of the second welding electrode and that is greater than an electrical resistivity of the aluminum or aluminum alloy workpiece; and
performing a plurality of third individual resistance spot welds to the third workpiece stack-up, the cover or the second cover abutting the aluminum or aluminum alloy workpiece of the third workpiece stack-up while the third individual resistance spot welds are performed.

15. The method as set forth in claim 14, further comprising:
redressing the weld face of the second welding electrode after performing the plurality of second individual resistance spot welds to the second workpiece stack-up but before attaching the cover or the second cover to the second welding electrode and performing the plurality of third individual resistance spot welds.

16. The method as set forth in claim 1 wherein the cover is composed of molybdenum, tungsten, or niobium, and further comprising:
providing a second workpiece stack-up that includes a steel workpiece and an aluminum or aluminum alloy workpiece;
re-attaching the cover at least over the weld face of the second welding electrode, the cover being removably attached to the second welding electrode; and performing a plurality of second individual resistance spot welds to the second workpiece stack-up, the cover abutting the aluminum or aluminum alloy workpiece of the second workpiece stack-up while the second individual resistance spot welds are performed.

\* \* \* \* \*